Nov. 14, 1967  J. D. JOHNSON  3,352,148
TEST BAR FOR HARDNESS TESTING MACHINES
Original Filed Aug. 1, 1963
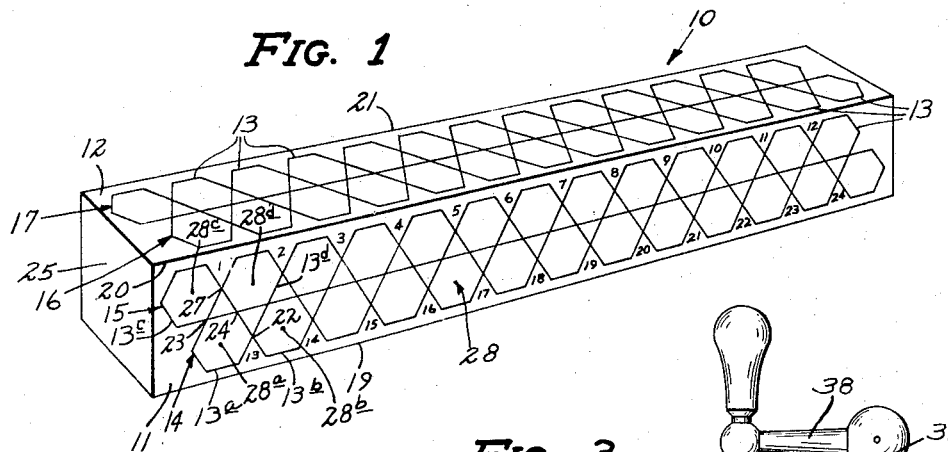
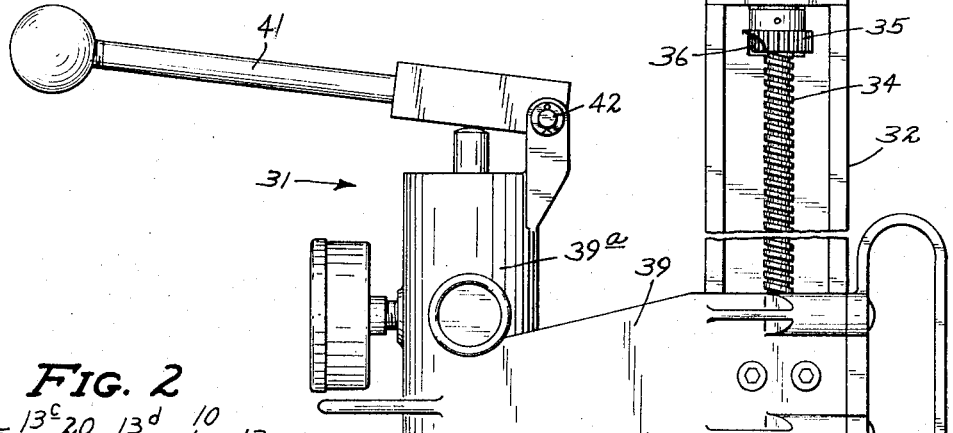
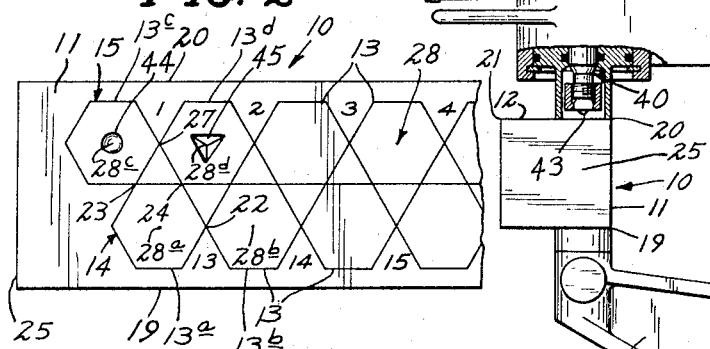
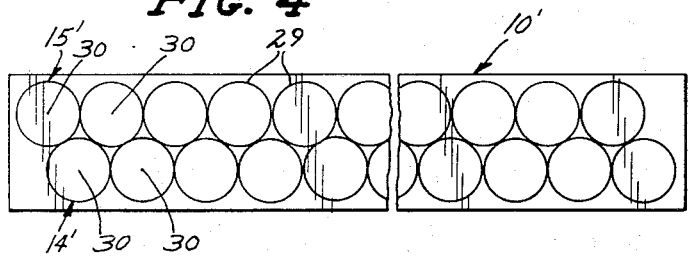
INVENTOR.
JOHN DAVID JOHNSON
BY
ATTORNEYS United States Patent Office 3,352,148
Patented Nov. 14, 1967

3,352,148
TEST BAR FOR HARDNESS TESTING MACHINES
John David Johnson, P.O. Box 538, Anoka, Minn. 55303
Continuation of application Ser. No. 299,318, Aug. 1, 1963. This application Oct. 7, 1966, Ser. No. 585,207
14 Claims. (Cl. 73—81)

ABSTRACT OF THE DISCLOSURE

A test bar for hardness testing which is marked to define areas of test. Each area is remote from adjacent areas such that the flow of metal resulting from the test does not effect the metal in adjacent areas. The marking is such as to produce the greatest number of test areas possible on the surface of the bar. The bar in one form of the invention is thick enough so that the metal flow produced by tests on one face does not cause metal changes such as to effect tests produced on the opposite face.

---

This application is a continuation of application No. 299,318, filed Aug. 1, 1963, now abandoned.

This invention relates to the hardness testing of metal and metal-like materials. More particularly this invention is directed to a test block for hardness testing and to the method of using the same in combination with conventional hardness testing machines as for use in determining hardness by the Brinell, Rockwell, or the like, test procedures.

As those skilled in the art will readily appreciate, indentation testing is very widely used in industry for the determination of metal hardness. In recent years, test procedures have developed which enable a person to quickly make hardness tests with a minimum of equipment and still achieve great accuracy in measurements. Such hardness testing machine is described for example, in United States Patent 2,849,876. Particularly, in the case of making Rockwell hardness measurements, it is necessary to employ test blocks in order to check the accuracy of the tests or of the hardness measuring machine. The characteristics which these test blocks possess are very carefully defined by the American Society for Testing Materials in the various tests which have been developed over the years for hardness testing, see for example ASTM Tests Nos. E18–60T, E10–60T and E92–57. Because of the rigid test procedures which have been developed, it has been necessary to employ relatively large frequently bulky quantities of metal in conducting Rockwell tests and other tests, owing primarily to the need for test blocks with test faces large enough to permit a plurality of indentation tests on each single face without departing from prescribed test procedures.

There has been a real and long-felt need in the art for a means and method for minimizing the quantities of metal required for hardness tests. No means has heretofore been available in hardness testing which would easily and simply permit the tester to conduct tests on the face of a test block without risking the possibility that successive indentations would be too close together. Also, no means has been available which would permit a tester to make a maximum number of tests on a single face of a test block. Further, no means was available which would enable a tester to positively identify and distinguish one impression site from another. The present invention provides simple, effective means for accomplishing all of these functions.

In the present invention, one takes an impression test bar having a generally planar test face and defines thereon a plurality of individual test areas or geometric figures. By setting out these areas and optionally identifying as by numbering each, there is obtained a ready means for invariably achieving proper spacing between successive tests and, optionally permanently distinguishing one test from the other. Thus a tester simply makes a test in the center or approximate center of each area or figure and thereby automatically achieves proper spacing and, optionally identification for that test.

It is, therefore, an object of the invention to provide a test block for hardness testing which permits one to make a maximum number of test indentations on a given block and still maintain all the standards for test accuracy and without modifying existing test equipment or requiring alteration of existing specifications for hardness testing.

Another object of this invention is to provide a method of hardness testing employing a test block having marked on each of a plurality of faces a plurality of equally sized, regular geometric figures.

It is another object of this invention to provide a test bar which is rectangular in cross section and has the shape of a regular parallelopiped which has marked on each of two adjacent faces a plurality of equally sized, regular geometric figures, said figures being arranged and being so chosen in size as to permit the packing upon a single test block faces of a maximum number of such figures.

Other and further objects will become apparent to those skilled in the art from a reading of the attached specification taken together with the drawings wherein:

FIG. 1 is a view in perspective of an embodiment of a test block of the invention;

FIG. 2 is an enlarged fragmental view in top plan of the embodiment shown in FIG. 1 whereon a single test indention has been made for illustration purposes;

FIG. 3 is a view of a conventional hardness tester using the block shown in FIG. 1, some portions thereof broken away and some portions thereof shown in sections; and FIG. 4 is a view in top plan showing a block similar to FIG. 1 but having a different pattern of geometric figures marked thereon.

There is seen in FIG. 1 a test block of the invention which is herein designated in its entirety by the numeral 10, the block is seen to be in the form of an elongated cross sectionally square bar constructed of metal-like material of uniform quality. More specifically, the block 10 has a geometric form of a rectangular parallelepiped whose end faces are each square.

The block 10 has one pair of adjoining rectangular faces designated by the respective numerals 11 and 12 in FIG. 1, each marked by the pattern of equally sized hexagons, each hexagonal figure being designated in its entirety by the numeral 13. The hexagons 13 on each respective rectangular face 11 and 12 are arranged into two lengthwise extending adjoining rows. Thus face 11 is marked with hexagon rows 14 and 15, respectively, and face 12 is marked with rows 16 and 17.

In a given row of hexagons, one side of each hexagon is spaced from and parallel to one edge of said parallelepiped 10. Thus, one face of each hexagon 13 in row 14 on face 11 is parallel to the edge 19 of face 11. Similarly, one face of each hexagon 13 in row 15 on face 11 is parallel to the edge 20 of face 11. Still similarly, one face of each hexagon 13 in row 16 on face 12 is parallel to the edge 20 of face 12. And finally, one face of each hexagon 13 in row 17 on face 12 is parallel to the edge 21 of face 12.

A corner of each hexagon 13 in a row 14, 15, 16 or 17, abuts a corner of an adjacent hexagon in that row. Thus, in row 14 for example, hexagon 13a has one corner 22 which abuts a corner of the adjoining hexagon 13b.

The hexagons in each row are in staggered relationship to the hexagons in the adjoining row on each face, so that, with the exception of an end hexagon in each row each hexagon in a given row has two corners each of which abut against the corners of a different hexagon in the adjacent row on that face. Thus, hexagon 13a has corner 23 abutting an adjacent corner of hexagon 13c, hexagons 13c and 13d, respectively, being themselves adjoining hexagons in row 15, the row which is adjacent row 14 on face 11 in FIG. 1.

It thus appears that there is a staggering effect in adjoining rows 14 and 15 on face 11 and adjoining rows 16 and 17 on face 12 whereby the end hexagons in each such row are not one above the other but rather one is nearer to an end face than the other. Thus, for example, the hexagon 13c is in closer proximity to the end face 25 than is the hexagon 13a. The exception above referred to occurs as a result of this staggering effect and means that as a consequence the hexagon which projects closest to an end face, as for example hexagon 13c in relation to end face 25, has only two of its corners, 23 and 27, bound into the structures of adjoining hexagons, in this exemplatory instance hexagon 13a and 13d.

The size of the hexagons, all of which are identical or congruent with respect to one another as indicated, is so chosen that the distance from the center of each such hexagon to the nearest edge, 19, 20 or 21 respectively, is not less than (i.e. at least) one-half the distance between the centers of any two adjoining hexagons, for example, 13a or 13c or 13a and 13d. The center of each hexagon is designated by the number 28; thus, the center of each respective hexagon 13a, 13b, 13c and 13d is 28a, 28b, 28c and 28d. The hexagons can be marked on each face 11 and 12 by any convenient means using ink, superficial surface abrasion, or the like, as long as such marking does not interfere with the functionality of the block for hardness testing purposes. The manner of marking and the selection of the size of the individual hexagons within the limits aforedesignated is within the province of those having ordinary skill in the art, and hence no description relative thereto is given herein.

It will be appreciated that the end result of the foregoing described patterned relationship between the hexagon 13 on the block 10 in effect spaces the individual centers 28 at constant distances both from one another and from both respective side edges, 19, 20 and 21 respectively.

It would be appreciated that in FIG. 4, unless otherwise indicated, reference numerals with prime marks added thereto designate parts or portions like those designated by the same numeral without prime marks added thereto in FIG. 1.

Those skilled in the art will appreciate that other geometric figures besides the hexagon can be used to achieve the same or similar results such as triangles, circles, squares, rectangles, etc. As an illustration of a use of circles, reference may be had to FIG. 4 where there is shown one side of a block 10' whereon there has been marked a plurality of circles, each designated in its entirety by the numeral 29 and each having a center 30. These circles are arranged in two longitudinally extending rows 14' and 15' respectively, and in general the relationship between the respective centers 30 is like that between the respective centers 28 in block 10 as aforedescribed.

The manner in which the blocks 10, 10' or the like, are used will now be described. Referring to FIG. 3, there is seen a hardness testing device known to the trade as a Blosjo Porta Brinell Hardness Tester. This device is described, for example, in United States Patent 2,849,876, and so no detailed description is given herein; however, for reference purposes, it is noted that the entire device will be referred to by the numeral 31. The hardness tester 31 comprises in combination a supporting member 32 providing a central web and having threaded shaft means 34 longitudinally extending thereof and having its opposite end regions each journalled in a bearing, not shown. Such threaded shaft means 34 is provided at its upper end with gear means 35 cooperating with gear 36 carried by one end of stub shaft 37 journalled in the upper end portion of the member 32. The arrangement is such that when the shaft 37 is rotated by means of crank arm 38 fast on the other end of the stub shaft 37 the threaded shaft means 34 is caused to rotate. When the threaded shaft means 34 rotates, it moves a jaw 39 which slidably engages the supporting member 32 and is adapted for movements toward and away from operative engagement with the jaw 33.

Thus the jaw 39 is movable by the threaded means 34 into a position to engage the surface of a test block 10 being tested between jaw 33 and jaw 39. Jaw 39 carries means for producing an indent upon the block 10 after the jaws 39 and 33 engage the block 10. The means for producing indents as herein designated in its entirety by the numeral 40. Such means 40 is provided with hydraulically actuated means not shown in full but contained within the housing 39a of jaw 39 which powers downward movements of indentation means 40 responsive to manual pressures exerted upon pivoting lever 41 so that when lever 41 pivots about its fulcrum 42 a ball 43 associated with indentation means 40 is pressed into a predetermined point upon a test block 10 held by the jaws 33 and 39, and thereby producing the typical indent 44, which is the characteristic mark left by an indentation ball. The typical indent 45 is the characteristic mark left by a diamond shaped indentation pyramid (not shown) when such diamond pyramid is used in place of a ball 43.

The hardness tester 31 is particularly adapted for rapid indentation hardness testing of metal materials as those skilled in the art will appreciate. This machine is of use in conducting the Brinell Hardness, Diamond Pyramid Hardness, Rockwell Hardness and Rockwell Superficial Hardness tests.

In conducting the foregoing tests, in accordance with the standard American Society for Testing Materials specifications, it is necessary that the tests be conducted on specimens having certain physical characteristics. Thus, for example, in Diamond Pyramid Hardness tests the thickness of the test specimens must be at least one and one-half times the length of the diagonal of the diamond indent penetrator. Furthermore, the spacing of indentation must be such that each indent or impression must not be closer to any edge of the test specimen or to another impression on the test specimen than a distance equal to two and one-half times the length of diagonal of the impression.

Furthermore, in comparison specimens when one is checking the load application of a Diamond Pyramid Hardness testing machine, the impression shall be spaced on each specimen in such a way that the centers of the adjacent impressions are not less than five diagonal lengths apart.

A different set of dimensional limitations for test impressions and test specimens exists in the Rockwell Hardness and Rockwell Superficial Hardness Testing procedures. Since these limits and dimensional criticalities are all well known and set forth, particularly in the various American Society for Testing Materials specifications, no need to review them in detail herein is seen, particularly in the interest of avoiding prolixity.

It is a unique characteristic of the test blocks of my invention that, when they are used for conducting hardness tests as with a hardness tester 31, one can obtain a maximum number of indentations upon a single test block 10 and still not deviate from the standards for minimum spacing between indentation as, for example, set forth in the various test specifications of the American Society for Testing Materials, above described. Consequently, the test blocks of my invention are of great value to testing hardness of metallic materials.

A preferred embodiment of my invention is a test bar whereon the maximum number of generally like geometric figures are imprinted thereon consistent with the standards for hardness testing set up by the American Society for Testing Materials. For example, common hardness test standards provide that the distance between indent centers shall be not less than two and one-half times the indent center diameter and that no indent shall be closer to a side edge of the test block than a distance not less than one-half the distance between indent centers. Such test standards are met and a maximum number of like geometric figures are placed on a test face when two adjacent rows of geometric figures are imprinted on a test face and the figures in each row are staggered with respect to those in the other adjacent row on a given face so that there is an included angle of 60° between a line through centers of the figures in one row and a line between the center of one of the figures in one row and the center of an adjacent figure in the adjacent row.

The size of the figures and their disposition relative to the edge of the bar is such that the shortest distance of the center of each geometric figure from the nearest side edge is not less than one-half the distance between indent centers, and the distance between centers of adjoining figures is at least two and one-half times the distance through the head of the particular indentation means being employed for hardness testing.

Not only is my test block of extreme value in the comparison of indentations made thereon and on sample materials to be tested, but it is also of equal utility in the calibrating of testing machines, for the purpose of maintaining the accuracy thereof.

It will be appreciated that opposite ones or all of the sides or faces of my test block are adapted for use as test areas and may be delineated as shown and above described. Further, if desired, any one or more surfaces of the block may be provided with a plurality of rows, or groups of rows, of geometrical configurations with those of one row of group of rows being of a different size than those of another row or group of rows. With such an arrangement, one row or group thereof is used in connection with an indentation element, such as a ball, of a given dimaeter, the other row or group thereof being used in connection with an indentation element of a different size.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

What is claimed is:

1. An impression test apparatus comprising a bar of metal having a flat face and means on said face delineating a plurality of contiguous geometrical figures substantially covering said face, the center areas of said figures being spaced from each other a distance such that the deformation of the metal in the center area of one geometrical figure by a preselected tool under a preselected load will deform a substantial area of each figure and not deform the metal beyond said one figure, whereby a maximum number of tests can be performed on the face.

2. A device as defined in claim 1 wherein the geometrical figures are similar and closed.

3. A device as defined in claim 1 wherein one row of figures is adjacent one edge of the flat face and a second row of figures is adjacent the opposite edge of said face.

4. A device as defined in claim 3 wherein said means comprises lines printed on the said face.

5. A device as defined in claim 3 wherein said means is etched in said face.

6. A device as defined in claim 3 wherein said means is cut in said face.

7. A device as defined in claim 3 wherein the center areas of said figures are spaced apart sufficiently to meet the specifications of a hardness test as defined by the American Society of Testing and Materials.

8. A device as defined in claim 3 further including a second flat face spaced from and parallel to said first face and having a row of geometrical figures delineated along each edge.

9. A device as defined in claim 8 wherein the faces are opposite and spaced apart a distance such that the metal deformed in one area by said tool and load will not deform the metal on the opposite face.

10. A device as defined in claim 8 wherein the faces are spaced apart a distance equal to at least twice the thickness of the metal deformed by the penetration of said tool under said load.

11. A device as defined in claim 1 wherein the center area of one of the figures is provided with a pyramidal indentation and the distance between the center areas of said figures is not less than five diagonal lengths of the indent.

12. A device as defined in claim 1 wherein one of the figures is provided with a spherical indentation in the center area and the distance between the center areas is at least three times the diameter of said indentation.

13. A device as defined in claim 12 wherein the thickness of the bar is not less than six millimeters.

14. A device as defined in claim 12 wherein identifying indicia are adjacent each figure.

References Cited

UNITED STATES PATENTS

| | | | |
|---|---|---|---|
| 1,157,762 | 10/1915 | Commons | 33—174 |
| 1,560,627 | 11/1925 | Wiart | 283—1 X |
| 2,491,672 | 12/1949 | Lowenstein | 33—174 |
| 2,849,876 | 9/1958 | Blosjo | 73—81 |

OTHER REFERENCES

1954 Supplement to Book of ASTM Standards—Part 1. Published by ASTM, Philadelphia 1954, pp. 565–568 and 574–582.

JAMES J. GILL, *Acting Primary Examiner.*

RICHARD C. QUEISSER, *Examiner.*

JERRY W. MYRACLE, *Assistant Examiner.*